(12) United States Patent
Hisserich et al.

(10) Patent No.: US 12,275,057 B2
(45) Date of Patent: Apr. 15, 2025

(54) DIE FOR DEFORMING MATERIAL IN A JOINING TOOL, JOINING TOOL AND METHOD FOR IDENTIFYING AND/OR DETECTING THE CONDITION OF A DIE

(71) Applicant: Newfrey LLC, New Britain, CT (US)

(72) Inventors: David Hisserich, Giessen (DE); Dirk Müller, Giessen (DE); Andreas Tripp, Giessen (DE); Michael Blöcher, Giessen (DE)

(73) Assignee: Newfrey, LLC, New Britain, CT (US)

( * ) Notice: Subject to any disclaimer, the term of this patent is extended or adjusted under 35 U.S.C. 154(b) by 0 days.

(21) Appl. No.: 18/304,056

(22) Filed: Apr. 20, 2023

(65) Prior Publication Data

US 2023/0256501 A1 Aug. 17, 2023

Related U.S. Application Data

(62) Division of application No. 15/901,146, filed on Feb. 21, 2018, now Pat. No. 11,633,780.

(30) Foreign Application Priority Data

Feb. 21, 2017 (EP) ..................................... 17157251

(51) Int. Cl.
*B21J 15/28* (2006.01)
*B21D 37/00* (2006.01)
(Continued)

(52) U.S. Cl.
CPC .............. *B21J 15/28* (2013.01); *B21D 37/00* (2013.01); *B21D 39/031* (2013.01); *B21J 13/02* (2013.01);
(Continued)

(58) Field of Classification Search
CPC .. B21J 13/02; B21J 15/025; B21J 15/28–285; B21J 15/36; B21D 37/00;
(Continued)

(56) References Cited

U.S. PATENT DOCUMENTS 6,424,821 B1* 7/2002 Komai ............... G05B 19/4142
455/66.1
2005/0237195 A1 10/2005 Urban
(Continued)

FOREIGN PATENT DOCUMENTS

CN 201215661 Y 4/2009
CN 102799142 A * 11/2012
(Continued)

OTHER PUBLICATIONS

Translation of CN102799142 (Year: 2012).*
Translation of CN201215661 (Year: 2009).*

*Primary Examiner* — Matthew P Travers
(74) *Attorney, Agent, or Firm* — Harness, Dickey & Pierce, P.L.C.

(57) ABSTRACT

A die for deforming a workpiece material in a joining tool comprises a head with a top side partially defining a cavity in which the workpiece material is to be deformed, a bottom side opposite the top side, a lateral side arranged between the top side and the bottom side, and a stem which extends along a longitudinal axis from the bottom side of the head. The die further comprises an identification tag, preferably an RFID tag, having an antenna for receiving and/or transmitting a signal, and a storing element for storing information, and the antenna is wrapped circumferentially around the head, such that the antenna entirely surrounds the head. The head may also include a groove extending around the head on the lateral side with the antenna arranged in the groove. Addi- (Continued)

tionally, the die may include a recess with the storing element located in the recess.

18 Claims, 3 Drawing Sheets

(51) Int. Cl.
  *B21D 39/03* (2006.01)
  *B21J 13/02* (2006.01)
  *B21J 15/02* (2006.01)
  *B21J 15/36* (2006.01)
  *B23Q 17/00* (2006.01)
  *B23Q 17/09* (2006.01)
(52) U.S. Cl.
  CPC ............. *B21J 15/025* (2013.01); *B21J 15/36* (2013.01); *B23Q 17/006* (2013.01); *B23Q 17/0909* (2013.01)
(58) Field of Classification Search
  CPC ...... B21D 37/10; B21D 39/031; B23Q 17/00; B23Q 17/006; B23Q 17/0909; B23Q 17/0957; B23Q 17/0995
  See application file for complete search history.

(56) References Cited

U.S. PATENT DOCUMENTS

| | | | | |
|---|---|---|---|---|
| 2011/0016939 | A1* | 1/2011 | Clew | B23Q 17/0909 29/524.1 |
| 2015/0121679 | A1* | 5/2015 | Bartig | B21J 15/025 29/524.1 |
| 2015/0347793 | A1* | 12/2015 | Hsiao | G06K 7/10366 340/10.5 |
| 2016/0158849 | A1* | 6/2016 | Coleman | F16P 3/00 279/126 |
| 2016/0288198 | A1 | 10/2016 | Tripp et al. | |
| 2017/0224400 | A1* | 8/2017 | Mistry | A61B 17/1659 |

FOREIGN PATENT DOCUMENTS

| | | | | |
|---|---|---|---|---|
| DE | 20013519 | U1 * | 6/2001 | ............... G01D 5/48 |
| DE | 102004002593 | A1 | 7/2004 | |
| DE | 102012207391 | A1 | 11/2013 | |
| DE | 102013021055 | A1 | 6/2015 | |
| WO | WO-2005005074 | A1 * | 1/2005 | ............. B21D 37/00 |

\* cited by examiner

DIE FOR DEFORMING MATERIAL IN A JOINING TOOL, JOINING TOOL AND METHOD FOR IDENTIFYING AND/OR DETECTING THE CONDITION OF A DIE

CROSS-REFERENCE TO RELATED APPLICATIONS

This application is a divisional of U.S. patent application Ser. No. 15/901,146, filed on Feb. 21, 2018, which claims the benefit and priority of European Patent Application No. 17157251.4, filed Feb. 21, 2017. The entire disclosure of each of the above applications are incorporated herein by reference.

FIELD

The present disclosure relates to a die for deforming material in a joining tool having a head comprising a top side defining a die cavity in which material is to be deformed, a bottom side opposite the top side and a lateral side arranged between the top side and the bottom side. The die further comprises a stem which extends along a longitudinal direction from the bottom side of the head.

In addition, the present disclosure relates to a joining tool system comprising a die, a die holder in which the die is supported such that the die is operational with the die cavity being exposed to receive material and a setting tool supported by one arm over the top side of the die.

Finally, the present disclosure relates to a method for identifying and/or detecting the condition of a die, such as, among other things, damage of the die or a complete absence of a die from the die holder.

More particularly, but not exclusively, the present disclosure relates to die used in fastening application. The die can be used in particular for self-piercing riveting, punch riveting or clinching.

BACKGROUND

This section provides background information related to the present disclosure which is not necessarily prior art.

Fastening arrangements with a die like self-piercing rivet arrangement are used in particular, but not exclusively, in the automobile industry to produce vehicles bodies.

Self-piercing riveting or punch riveting has recently become established as a production method, since it is suitable in particular for connecting different materials. In self-piercing riveting a rivet of a particular configuration is inserted into a workpiece such as, for example, one or more sheets of material, without full penetration such that a deformed end of the rivet remains encapsulated by an upset annulus of the material. The rivet typically comprises a head and a partially hollow cylindrical shank that terminates in an annular piercing edge. The rivet is driven into the workpiece arrangement by a punch of a setting tool. The die acts on the underside of the workpiece arrangement. A shank of the rivet pierces the top sheet and then flares outwardly in the die such that the sheet material forms an annulus in a die cavity that encapsulates the shank.

In addition to the punch and self-piercing riveting method, clinching is also used. Clinching can be carried out with or without an auxiliary joining element. The assembly is carried out using a die and a punch to plastically form an interlock between the partners (for example two or more sheets of material). The die ensures that material flows radially outwards, such that an undercut is formed.

The forces which are to be applied to the workpiece during the joining methods described above will be high in many applications and the die is therefore subject to very high loading and wear. Dies can crack and/or break into pieces. Thus, the die needs periodic inspection and replacement, in order to ensure that the needed strength of the joint is achieved.

The life expectancy of a die is dependent on many factors including, for example, the number of cycles to which it is subjected, the setting forces, the materials of the workpiece being used, the alignment of the die to the workpiece and the punch, the material properties of the die (the life expectancy can be reduced particularly when use is made of comparatively hard materials or materials having a low ductility), the quality of the surface on which the die is supported, the degree of retention of a die holder and instances of operation (erroneous or for testing purposes) in which the setting tool impacts directly on the die.

A faulty die can cause unsightly distortion of the sheet material and the strength of the joint may be compromised as a consequence.

There is therefore a need to check for faults in a die.

It is known to use a fluid medium to check for faults in a die. DE102004002593 discloses a method using a fluid medium supplied to cavities in regions of a joining tool system via channels. The pressure or flow rate of this medium is measured. The actual value of the pressure or flow rate is compared with an intended value and the result of the comparison is the basis of the checking process. Not only does this method require an expensive investment in machinery but it also introduces delays into the rivet cycle time.

Document DE102012207391 discloses a device with a rivet unit having a punch and a die. The device further comprises a test element with a sensor to determine eventual damages in the die. The sensor is moved after each riveting operation toward the die to check for any damages. The sensor is an ultrasound sensor, an image sensor, an inductive sensor or a thermal sensor and is driven around the die. This method introduces delays into the rivet cycle time. The manufacturer has to balance the quality control benefits provided by performing the checking process at regular intervals against the time it takes. If the checking process reveals a broken or missing die then all the joints performed since the preceding check are potentially faulty and they either have to be checked or scrapped.

SUMMARY

This section provides a general summary of the disclosure, and is not a comprehensive disclosure of its full scope or all of its features.

It is one object of the present invention, amongst others, to obviate or mitigate at least one of the aforementioned disadvantages and to provide for an improved or alternative die which allows an easy determination of its eventual damages. It is also an object of the invention to provide a joining tool system and a method for identifying and/or detecting the condition of a die that enables a direct identification and detection of the condition of a die without expensive investment in machinery and without introducing delays into the joining cycle time. In the present application, the term "condition of the die" is intended to include, amongst other things, damage of the die, the complete absence of a die from a die holder, the service life of the die or the technical characteristics of the die.

To this aim, according to the invention, it is provided a die for deforming material in a joining tool having:

a head comprising a top side defining a die cavity in which material is to be deformed, a bottom side opposite the top side and a lateral side arranged between the top side and the bottom side, and a stem which extends along a longitudinal direction from the bottom side of the head, characterized in that the die comprises an identification tag having an antenna for receiving and/or transmitting signal and a storing element for storing information, and in that the antenna is wrapped around the head, such that the antenna entirely surrounds the head.

The present die allows a quick and easy identification through the identification tag. The position of the antenna for receiving and/or transmitting signal is such that any damages that occur in the die will also damage the antenna, enabling the antenna to receive or transmit information. The antenna can thus act as a sensor. The position of the storing element and antenna does not structurally or functionally affect the die. The present die is easy to manufacture, without any expensive investment in machinery. Besides, the position of the antenna (entirely around the head) could allow a 360 degrees reading capacity. A reader device can communicate with the antenna independently from the orientation or arrangement of the die.

According to an aspect, the die comprises a groove extending around the head on the lateral side between the top side and the bottom side and the antenna is arranged in the groove. The antenna does not protrude from the head of the die, which reduces the risks to deteriorate the antenna during the manipulation of the die.

According to an aspect, the die further comprises a recess and the storing element is arranged in the recess. The storing element does not protrude from the die, which reduces the risks to deteriorate the storing element during the manipulation of the die. The recess may be located at any place, and not necessarily close to the antenna. The positioning also reduces the contamination of the identification tag.

The identification tag is thus integrated to the die and its positioning avoid any premature or irregular wear.

According to an aspect, the recess is provided on the lateral side of the head. The recess is thus easy to manufacture without modifying the general shape of the die or the functional surfaces of the die.

According to an aspect, the distance between the antenna and the top side is smaller than the distance between the storing element and the top side. More particularly the antenna is arranged in the vicinity (and as close as possible) of the top side such that a deterioration of the top side of the die will lead to a deterioration of the antenna. If the antenna is provided in a groove and the storing element is provided in a recess, the grove is closest from the top side than the recess.

According to an aspect, the head and the stem are generally cylindrical. The stem is of reduced diameter compared to the head. The die can easily be supported by a die holder and a die exchanger can be used to replace a die by another.

According to an aspect, the identification tag is a radio frequency identification (RFID) tag. RFID tags are easy to use and to manage. Their implementation allows a good traceability of the die. The identification tag may also be a Near-field communication (NFC) tag.

According to an aspect, the identification tag is covered by a material. This allows the outer surface of the die to not have any unwanted unevenness on the outside surface of the die.

Another object of the present invention is a joining tool system comprising:

a. a die for deforming material in a joining tool having a head comprising a top side defining a die cavity in which material is to be deformed, a bottom side opposite the top side and a lateral side arranged between the top side and the bottom side, and a stem which extends along a longitudinal direction from the bottom side of the head, wherein the die comprises an identification tag having an antenna for receiving and transmitting signal and a storing element for storing information, and the antenna is wrapped around the head, such that the latest entirely surrounds the head, b. a die holder in which the die is supported such that the die is operational with the die cavity being exposed for receipt of material, c. a setting tool supported by one arm over the top side of the die, d. a reader device which communicates and receives data on a contactless basis from the identification tag, wherein the identification tag acts as a sensor.

The position of the identification tag allows it to act as a sensor and to reflect a change condition of the die. A damage of the die will damage the antenna which prevents the communication with the reader device. One unique identification tag can be used for several applications: as a sensor, for labelling, for identification . . . .

According to an aspect, the setting tool is supported by a first arm of a C-frame and the die is supported by a second arm of the C-frame.

According to an aspect, the reader device is arranged on the C-frame. This allows an immediate and "in-situ" detection of a change of the die condition with an ongoing communication. In another embodiment the reader device may be arrange at a particular distance from the C-frame. The manipulator can freely dispose the reader device at a preferred position, depending on obstruction, needs . . . .

Another object of the present invention is a method for identifying and/or detecting the condition of a die for deforming material in a joining tool, the die having a head comprising a top side defining a die cavity in which material is to be deformed, a bottom side opposite the top side and a lateral side arranged between the top side and the bottom side, and a stem which extends along a longitudinal direction from the bottom side of the head, wherein the die comprises an identification tag having an antenna for receiving and/or transmitting signal and a storing element for storing information, and the antenna is wrapped around the head, such that the antenna entirely surrounds the head, the method comprising the step of:

a. Providing a reader device which communicates and receives data on a contactless base from the identification tag, b. Establishing a regular communication between the identification tag arranged on the die and the reader device, c. Detecting a communication change between the identification tag and the reader device in order to detect a change in the condition of the die.

The method allows the use of the identification tag not only for identifying the die but also as a sensor to detect a condition of the die.

According to an aspect, the detected communication change between the identification tag and the reader device is a communication breakdown which detects a breach at the surface forming the top side of the die.

According to an aspect, the storing element stores identification and service life data, and the method further comprises the step of using the identification tag to detect an end of service life or a maintenance requirement.

According to an aspect, the method further comprises the step of using the identification tag to detect an incorrect setting of the die.

According to an aspect, the position of the reader device to establish a regular communication with the identification tag is independent from the orientation or arrangement of the die.

Another object of the present invention is a non-transitory computer readable storage medium having stored thereon computer readable instructions that, when executed at a computer system, cause the computer system to perform at least some of the steps of the method for identifying and/or detecting the condition of a die described above. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other characteristics and advantages of the invention will readily appear from the following description of embodiments, provided as non-limitative examples, in reference to the accompanying drawings.

In the drawings.

On the different figures, the same reference signs designate identical or similar elements.

DETAILED DESCRIPTION

Example embodiments will now be described more fully with reference to the accompanying drawings.

Figure 1:
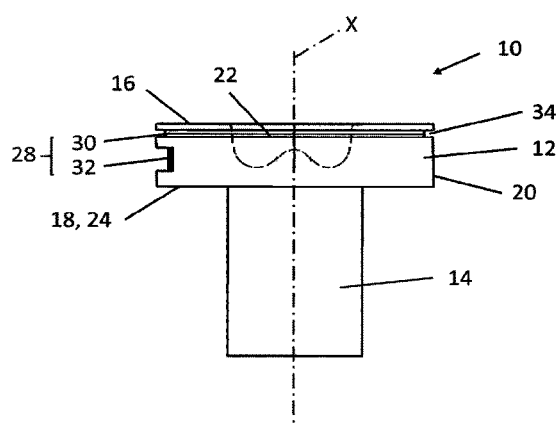
FIG. 1 shows a schematic side view of a die with a stem, a head and an identification tag in accordance with the present disclosure.
Figure 2:
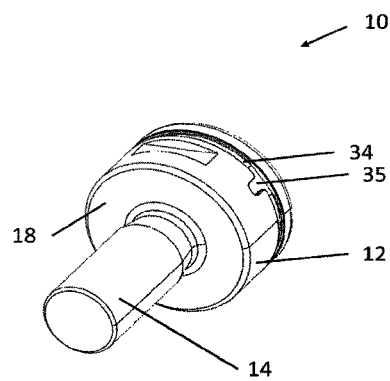
FIG. 2 shows a perspective view of a die with a stem, a head and an identification tag in accordance with the present disclosure.

Referring firstly to FIG. 1 and FIG. 2, there is shown a die 10 for deforming material in a joining tool. The die 10 comprises a head 12 as well as a stem 14. The die extends along a longitudinal axis X. As illustrated, the head 12 and the stem 14 are circular in cross section. The stem 14 is of reduced diameter compared to the head 12. In other embodiments, the head 12 and/or the stem 14 may have square or oval cross sections.

The head 12 comprises a top side 16, a bottom side 18 and a lateral side 20 arranged between the top side 16 and the bottom side 18. The lateral side 20 forms the outer circumference of the head 12. The top side 16 forms an upper surface. The top side 16 defines a cavity (or die cavity) 22 in which material is to be deformed. The head 12 is centered on the longitudinal axis. As illustrated, the cavity 22 may be centered on the lateral side 20 along the longitudinal axis X. The stem 14 being of reduced diameter compared to the head 12, an annular surface 24 extending radially relative to the longitudinal axis X is defined on the bottom side of the head 12.

The head 12 may be provided with a rotary entrainment contour. The rotary entrainment contour may be formed by one or two radial slots on the lateral side of the head 12.

The stem 14 extends along the longitudinal axis X from the bottom side 18 of the head 12. The stem 14 is dependent from the head 12. In other words, head 12 and stem 14 form a one-piece part. The stem 14 is destined to be inserted in a bore, recess, or aperture 46 in a die holder 26 (see FIG. 6) being either an adapter or a part of a body 44. The stem 14 may comprise a locking contour allowing a locking position of the stem 14 in the die holder 26.

The die 10 comprises an identification tag 28. The identification tag 28 has an antenna 30 for receiving and/or transmitting a signal and a storing element 32 for storing information. The information stored in the storing element 32 may be related to the die 10, like its type, its service life, its function and may be used to select the correct die 10 to carry out a particular assembly (or joining application) or to control that the mounted die 10 complies to the requirement needed to carry out the assembly (or joining application).

The antenna 30 is wrapped around the head 12. In other words, the antenna 30 entirely surrounds the head 12. The position of the antenna 30 could allow a 360 degrees reading position. In other words, the antenna 30 may transmit data (or information) on its entire circumference.

The antenna 30 may be arranged, as illustrated in FIG. 1, FIG. 2, FIG. 3 and FIG. 4 in a groove 34 or a slot extending around the head 12. The groove 34 extends around the head 12 on the lateral side 20. For instance, the groove 34 extends in the vicinity of the top side 16, such that the antenna 30 is arranged close to the top side 16 of the die 10. The antenna 30 is used to transmit or receive information from or to the storing element 32 on a contactless basis.

The dimensions of the groove 34 correspond to the dimensions of the antenna 30. Thus, the groove is particularly minimal or small, which reduces the impact of the groove 34 on the service life of the die 10.

The storing element 32 may be arranged in a recess or cavity 35. The recess 35 can be provided on the head 12 or on the stem 14. As seen in FIG. 1, FIG. 2, FIG. 3 and FIG. 4, the recess 35 is provided on the lateral side 20 of the head 12. The groove 34 is closest from the top side 16 than the recess 35.

The storing element 32 is spatially separated from the antenna 30. This separation reduces the risks of damages of the storing element 32. Even if the antenna is damaged, the storing element may be still working and a process can be implemented afterward to read the data collected in the storing element 32. In particular, the storing element 32 may be arranged in a location where the stresses and other mechanical strains are lower than at the top side of the die.

The recess 35 is arranged in a location where it does not sensibly impact the service life of the die. More particularly, the recess 35 is arranged in a location at distance from the top side 16 or other work areas.

The storing element 32 and/or the antenna 30 are incorporated in the die 10. The storing element 32 and/or the antenna 30 do(es) not protrude from the outer surface of the die 10.

Figure 4:
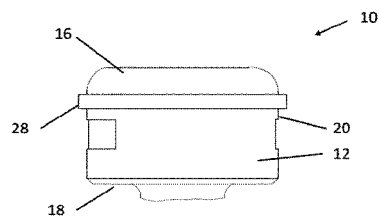
FIG. 4 shows an alternative embodiment of a head with an identification tag of a die in accordance with the present disclosure.

As illustrated in FIG. 4, the identification tag 28 can be snap fitted with the head 12. This snap fit connection allows the identification tag 28 to be easily removed.

Figure 3:
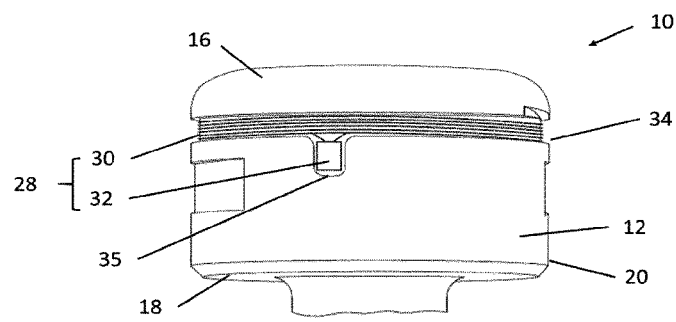
FIG. 3 shows a schematic perspective view of the head with an identification tag of the die of FIG. 1 or FIG. 2.

As illustrated in FIG. 1, FIG. 2 and FIG. 3 the identification tag 28, and more particularly the antenna 30 and the storing element 32 are each fixed in the recess 35 and the groove and cannot be removed.

Figure 5:
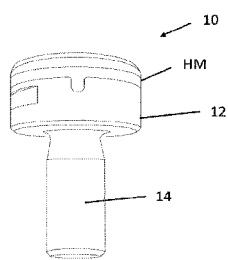
FIG. 5 shows a perspective view of the die with a material (or holt melt) covering the identification tag.

The storing element 32 can be fitted into the recess 35 or glued. The antenna 30 can also be fitted into the groove 34 or glued. The storing element 32 and/or the antenna 30 may be embedded in the die 10. For instance, the antenna 30 is arranged in the groove 34, the storing element 32 is arranged in the recess 35. As illustrated in FIG. 5, both the groove 34 and the recess 35 are covered with a material HM, such that the outside shape of the die 10 remain similar to the die of the state of the art and no premature wear occurs. In particular, the material HM allows to remove any unwanted unevenness of the outside surface of the die 10. Besides, no further arrangement in the die holder 26 are needed. The material HM covering the groove 34 and the recess 35 (and therefore the antenna 30 and the storing element 32) can be any covering material. More particularly, hot melt HM can be used. The hot melt is a thermoplastic polyamide adhesive. This allows the fixation of the identification tag 28 in the die 10. The identification tag 28 is thus totally embedded in the die 10.

The identification tag 28 communicates on a contactless basis with a reader device 36 through the antenna 30. The identification tag 28 may communicate through telemetry. For instance, the identification tag 28 is, as illustrated, a radio frequency identification (RFID) tag. The identification tag 28 allows transmission of data between the die 10 and the reader device 36 on a contactless basis. The antenna 30 of the identification tag 28 amplifies and transmits radio signals from the die 10 to the reader device 36. The position of the antenna 30 all around the head 12 prevent any fixed transmission/reception location of the reader device 36 or of the die 10. The antenna 30 may communicate with the reader device 36 at any time without any specific arrangement.

Figure 6:
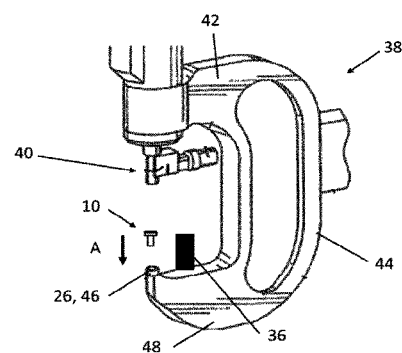
FIG. 6 shows a schematic perspective view of a joining tool system with a die, a die holder, a setting tool and a reader device, in accordance with the present disclosure.

Referring now to FIG. 6 of the drawings, a joining tool system 38 is illustrated. The joining tool system 38 as illustrated is a riveting tool system. However, it is to be appreciated that whilst the specific embodiment described herein relates to the insertion of rivets it has application to the formation of other joints including joints using other fasteners that are inserted into a works piece using a die such as, for example, clinching operation.

As shown on FIG. 6, a setting tool 40 is mounted on an upper or first arm 42 of the body 44 above the die 10. The body 44 is a conventional C-frame. The die 10 is inserted in the die holder 26. The die 10 is inserted in the die holder 26 in an axial direction (as illustrated with the arrow A). For instance, the die 10 is inserted along the longitudinal axis X. In other embodiments, other insertion direction may be implemented. The stem 14 is inserted into the aperture 46 of the die holder 26 and is fitted within the aperture 46. The fixation of the die 10 into the die holder 26 is, for example, described in WO2015090965 and will not be further described in this application. The die 10 can be interchangeable, as described in WO2015090965 and the joining tool system 38 may be provided with a die exchanger (not shown). The die exchanger is, for example, described in WO2015090965 and will not be further described in this application.

The die holder 26 can be an adapter or directly integrated to the C-frame, as previously described. The die 10 is supported through the die holder 26 in a lower or second arm 48 of the body.

For instance, the setting tool 40 is mounted in the first arm 42 of the C-frame whereas the die is supported by the second arm 48 of the C-frame. Rivets (not shown) are inserted by the setting tool 40 into a workpiece (not shown). The workpiece can comprise one of more sheets of material. The workpiece is supported over the die 10. In order to carry out the joining application, the setting tool 40 is driven such that a maintaining element (not shown) engage the workpiece and a punch is extended to insert the rivet. The body 44, as well known in the art, is mounted on a robot (not shown) and is movable toward and away from the workpiece as required.

The joining tool system 38 may be provided with a reader device 36. The reader device 36 communicates and receives data on a contactless basis from the identification tag 28. The reader device 36 can communicate and receive data on a contactless basis from the identification tag 28 on a regular basis, continuously or not.

The reader device 36 can be located at any convenient location which may be proximate the die 10 and the die holder 26 or may be distal therefrom. For example, the reader device 38 is provided, as illustrated in FIG. 6, on the body (or C-frame) 44, close to the die holder 26. More particularly the reader device 36 is arranged on the second arm 48 of the C-frame (or body) 44. The reader device 36 can thus communicate with the die 10 on a continuous basis.

In another embodiment (not shown), the reader device 36 may be distal from the area where the joining application is carried out. In such case, either the transmission is powerful enough to allow a remotely transmission, or the die 10 is driven to the reader device 36, for example between two joining application or at the end of a cycle, in order to collect and/or send data.

The storing element 32 can store and communicate information (or data) concerning the identification of the die, the nature of the die, the function of the die, production data, cycle numbers, strength curve . . . . Data can be written into the identification tag 28 by a writer device.

A processor may be provided for processing the data received and/or for diagnosing a condition of the die 10. A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, an application-specific integrated circuit (ASIC), a programmable logic array, a field-programmable gate array (FPGA), or the like. A computer or computer system may comprise one or more processors.

The processor may be used to collect the information received by the reader device 36 to determine if the die 10 already set up or planned to be used is the proper die to use for the current application, or if the die 10 already set up or planned to be used is still in good condition, or if the die 10 already set up or planned to be used did not exceed its service life. The processor can also use the information received by the reader device 36 to determine the presence or not of a die 10 in the die holder 26 and to prevent any erroneous operation.

The processor may execute a computer program product allowing the use of the collected data to diagnose a condition of the die. The diagnosis can be based on the collected data only or can be based on the collected data and empirical or prepopulated data.

The position of the antenna 30 in the die 10 is such that a damage to the top side 16 of the die, or more generally to the die 10 will also damage the antenna 30. If the antenna 30 is being damage, the communication between the reader device 36 and the storing element 32 is broken. A breakdown from communication can thus be analysed by a processor as a default and a possible damage to the die 10. The processor can order the actuator to stop its motion, such that the joining process is interrupted.

The identification tag 28 has therefore (at least) three functions (identification of the die, storage of measured data, break detection).

The identification tag 28 acts as a sensor to detect the condition of the die and any damage caused to the die. A break of the die may be detected immediately with a breakdown of the transmission between the antenna and the outside of the die.

The identification tag 28 acts as a labelling element, for example to check the origin of the die and detect a misuse of the die or a selection error.

The identification tag 28 can receive data relative, for example, to the use of the die or any other production data.

Figure 7:
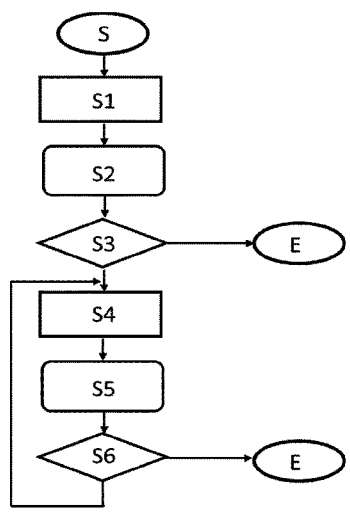
FIG. 7 shows a flow chart of a method for identifying and/or detecting the condition of a die, in accordance with the present disclosure.

FIG. 7 shows a flow chart of an embodiment of a method for identifying and/or detecting the condition of a die.

Firstly a joining process is started (step S). By selecting a predetermined joining process, data like the type of die 10 needed, the material of the workpiece or the type of rivet for example may be provided.

In a first step (step S1) the die 10 is inserted in the die holder 26.

Subsequently and/or simultaneously a communication (or transmission) between the die 10 and the outside of the die (for example the reader device 36 and/or the processor) is set up (step S2).

A test (step S3) is conducted to check the communication and/or to check that the transmitted data are correct with regard to the predetermined joining process to be carried out.

If the communication is broken or incorrect (NOK), the process can be interrupted (step E). In an embodiment, if the communication is broken or incorrect (NOK) the processor may indicate a default of the die 1 (for example that the die 10 is damaged), and the die 10 can be for example changed with a die exchanger.

If the data transmitted and/or received complies with the predetermined joining process (OK), the joining application is carried out (step S4).

Subsequently and/or simultaneously a communication (or transmission) between the die 10 and the outside of the die (for example the reader device and/or the processor) is set up (step S5).

A test (step S6) is conducted to check again the communication between the die and the outside of the die (for example the reader device and/or the processor).

If the communication is broken or incorrect (NOK), the process can be interrupted (step E). In an embodiment, if the communication is broken or incorrect (NOK) the processor may indicate a default of the die (for example that the die 10 has been damaged), and the die 10 can be for example changed with a die exchanger.

If the data transmitted and/or received complies with the predetermined joining process (OK), a further joining application is carried out (step S4). In another embodiment, a joint application different from the first application can be carry out. The die may be changed or not.

A writer device may be provided. The writer device may communicate with the identification tag 28 and data concerning the joining application already carried out may be transmitted to the identification tag 28 and stored in the storing element 32. The new data stored may be used later by the processor to diagnose an end of service life, for example.

Generally, any of the functions, methods, techniques or components described above can be implemented in software, firmware, hardware (e.g., fixed logic circuitry), or any combination thereof. The methods described herein could be performed by one or more processors executing code that causes the processor(s) to perform the methods.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method for identifying and/or detecting a condition of a die for deforming material in a joining tool, the method comprising the steps of:
   providing the joining tool including the die, the die including a head and a stem, the head having a top side defining a surface for deforming the material, a bottom side opposite the top side, a lateral side arranged between the top side and the bottom side, the stem extending along a longitudinal axis from the bottom side of the head;
   providing an identification tag including an antenna for receiving and/or transmitting a signal, and a storage for storing information, wherein the antenna is wrapped circumferentially around the head such that the antenna entirely surrounds the head;
   providing a receiver which communicates and receives data on a contactless basis from the identification tag;
   establishing a communication between the identification tag arranged on the die and the receiver; and
   detecting a communication change between the identification tag and the receiver in order to detect a change in the condition of the die, wherein the entire antenna is positioned between the storage and the top side of the head in a direction parallel to the longitudinal axis of the stem.

2. The method according to claim 1, wherein the detected communication change between the identification tag and the receiver is a communication breakdown which indicates damage to the top side of the head.

3. The method according to claim 1, wherein the storage stores identification, production data and service life data, and wherein the method further comprises the step of using the identification tag to detect an end of service life or a maintenance requirement.

4. The method according to claim 1, further comprising the step of using the identification tag to detect an incorrect setting of the die.

5. The method according to claim 1, wherein the antenna is positioned adjacent to the top side of the head.

6. The method according to claim 1, wherein the surface for deforming the material is disposed within a cavity defined by the top side of the head.

7. A method for assessing a condition of a die for deforming material in a joining tool, the method comprising:
   transmitting a signal using an antenna attached to the die;
   determining whether the die is damaged based on whether a receiver receives the signal from the antenna; and
   storing information about the die using a storage, wherein the die includes a head and a stem, the head has a top side defining a surface for deforming the material, and the entire antenna is positioned between the storage and the top side of the head in a direction parallel to a longitudinal axis of the stem.

8. The method according to claim 7, further comprising determining that the die is damaged when the receiver does not receive the signal from the antenna.

9. The method according to claim 7, further comprising determining that the die is damaged when the receiver stops receiving the signal from the antenna.

10. The method according to claim 7, wherein the storage is attached to the die and connected to the antenna, and wherein the signal transmitted by the antenna indicates the information stored in the storage.

11. The method according to claim 10, wherein the information stored by the storage includes at least one of an identification of the die, a type of the die, production data associated with the die, and a service life of the die.

12. The method according to claim 7, wherein the antenna is attached to a head of the die adjacent to a top side of the head.

13. A method for performing a joining process, the method comprising:
   establishing a communication between a receiver and an antenna attached to a die;
   determining whether to drive a setting tool toward the die based on the communication between the antenna and the receiver; and
   storing information about the die using a storage, wherein the die includes a head and a stem, the head has a top side defining a surface for deforming material, and the entire antenna is positioned between the storage and the top side of the head in a direction parallel to a longitudinal axis of the stem.

14. The method according to claim 13, further comprising assessing a condition of the die based on the communication between the antenna and the receiver.

15. The method according to claim 14, further comprising determining that the die is damaged when the communication between the antenna and the receiver is interrupted.

16. The method according to claim 14, further comprising indicating that the die is damaged when the communication between the antenna and the receiver is interrupted.

17. The method according to claim 13, further comprising:
   driving the setting tool toward the die when the communication between the antenna and the receiver is uninterrupted; and
   refraining from driving the setting tool toward the die when the communication between the antenna and the receiver is interrupted.

18. The method according to claim 13, wherein:
   the antenna is attached to the die adjacent to a top side of the die; and
   driving the setting tool toward the die includes moving the setting tool downward toward the top side of the die.

* * * * *